United States Patent
Manhart

(10) Patent No.: US 6,705,737 B1
(45) Date of Patent: Mar. 16, 2004

(54) REFLECTIVE OPTICAL APPARATUS FOR INTERCONVERTING BETWEEN A POINT OF LIGHT AND A LINE OF LIGHT

(75) Inventor: Paul K. Manhart, Tucson, AZ (US)

(73) Assignee: Raytheon Co., Lexington, MA (US)

( * ) Notice: Subject to any disclaimer, the term of this patent is extended or adjusted under 35 U.S.C. 154(b) by 0 days.

(21) Appl. No.: 10/224,834

(22) Filed: Aug. 20, 2002

(51) Int. Cl.⁷ .................................................. G02B 5/10
(52) U.S. Cl. ........................ 359/869; 359/853; 359/858; 359/868
(58) Field of Search ................................ 359/850, 851, 359/852, 853, 857, 858, 867, 868, 869

(56) References Cited

U.S. PATENT DOCUMENTS

| | | | | |
|---|---|---|---|---|
| 3,762,207 A | * | 10/1973 | Weiser ........................ | 359/869 |
| 5,037,191 A | * | 8/1991 | Cheng ........................ | 359/858 |
| 5,255,116 A | * | 10/1993 | Araki et al. ................. | 359/868 |
| 5,408,363 A | * | 4/1995 | Kano ......................... | 359/869 |
| 6,022,114 A | * | 2/2000 | Foo ............................ | 359/853 |

FOREIGN PATENT DOCUMENTS

JP 03172802 A * 7/1991 ............ G02B/5/10

* cited by examiner

Primary Examiner—Evelyn A. Lester

(57) ABSTRACT

An optical apparatus includes a nonplanar light-reflecting surface having a shape referenced relative to an orthogonal axial system having an x-axis, a y-axis, and a z-axis. The light-reflecting surface has a non-circular conic profile with a conic axis and a distance f from a conic vertex to a finite focal point of the conic, wherein the non-circular conic profile is determined in a yz-plane containing the y-axis and the z-axis. The light-reflecting surface has a circular profile with a circular center and a radius of curvature r numerically equal to the distance f from the conic vertex to the finite focal point of the conic, wherein the circular profile is determined in an xz-plane containing the x-axis and the z-axis. A point light transceiver is at a transceiver location, wherein the transceiver location lies on the conic axis in the yz plane, and also at the circular center in the xz plane.

18 Claims, 3 Drawing Sheets

REFLECTIVE OPTICAL APPARATUS FOR INTERCONVERTING BETWEEN A POINT OF LIGHT AND A LINE OF LIGHT

This invention relates to optical apparatus, and in particular to a reflective optical apparatus that interconverts between a point of light and a line of light.

BACKGROUND OF THE INVENTION

In optical systems such as linear displays and scanners, it is sometimes necessary to interconvert a light beam between a point of light and a line of light. "Point" and "line" are used in the sense of ideally being non-dimensional and one-dimensional features, respectively, but in reality having some breadth in other dimensions. For example, it may be necessary to produce a line of light for scanning or other output purposes from a point light source such as an optical fiber, a light emitting diode (LED), a laser diode, or a point external input to the optical system. In another example, it may be necessary to produce a point of light for analysis or other output purposes from a linear light source such as a linear filament or a linear external input to the optical system.

The available optical devices for making such a point-line interconversion utilize multiple lenses, usually at least a cylindrical lens and usually also a spherical lens. In a typical case, such optical devices include four lenses, some of which are cylindrical lenses and some of which are spherical lenses. These available interconversion devices have several drawbacks. Such multiple-lens systems are heavy, occupy a large volume and length in the beam path, are expensive, and are prone to misalignment. Additionally, lenses are prone to introduce aberrations into the beam passing therethrough, in the form of monochromatic and/or polychromatic aberrations. As a result, the desired interconversion between the mathematical line of light and the mathematical point of light is not as sharp as might be desired. Intrinsic aberrations (chromatic and monochromatic) and fabrication and alignment errors all contribute to the quality or fineness of the imaged point or line of light.

There is a need for an improved approach to the interconversion between a line of light and a point of light. The present invention fulfills this need, and further provides related advantages.

SUMMARY OF THE INVENTION

The present invention provides an optical apparatus for interconverting a light beam between a point of light and a line of light. The present approach uses no refractive lenses, reducing the problems associated with refractive optical systems such as excessive weight and size, expense, and misalignment. Significantly, the present approach does not introduce aberrations into the light beam, so that the interconversion between the point of light and the line of light is sharp and precisely defined, and is limited only by the diffraction of light. The present approach uses only a reflective optical element, so that the line/point interconversion optical system may be made light in weight, compact, inexpensive, resistant to misalignment, and free of monochromatic and polychromatic aberrations.

In accordance with the invention, an optical apparatus comprises a nonplanar light-reflecting surface having a shape referenced relative to an orthogonal axial system having an x-axis, a y-axis, and a z-axis. The light-reflecting surface has a non-circular conic profile with a conic axis and a distance f from a conic vertex to a finite focal point of the conic, wherein the non-circular conic profile is determined in a yz-plane containing the y-axis and the z-axis. The non-circular conic profile may be, for example, an ellipse, a concave or convex hyperbola, or, most preferably, an off-axis parabola. The light-reflecting surface further has a circular profile with a circular center and a radius of curvature r numerically equal to the distance f from the conic vertex to the finite focal point of the conic, wherein the circular profile is determined in an xz-plane containing the x-axis and the z-axis.

The optical apparatus further optionally includes a point light transceiver at a transceiver location. The transceiver location lies on the conic axis in the yz plane at the finite focal point a distance f away from the conic vertex, and also at the circular center in the xz plane. The point light transceiver may be a point light source directing a light beam toward the reflecting surface, at a single-wavelength or at multiple-wavelengths. The point light transceiver may instead be a point light receiver receiving a light beam from the reflecting surface. The light-reflecting surface may be concave or convex relative to the point light transceiver.

More generally, an optical apparatus effects an interconversion of a light beam between a non-dimensional point at a first location and a one-dimensional line at a second location. The optical apparatus comprises a nonplanar light-reflecting surface positioned on a beam path between the first location and the second location. The light-reflecting surface has a compound curvature having a non-circular conic profile with a conic axis and distance f from a conic vertex to a finite focal point of the conic, wherein the non-circular conic profile is determined in a first reference plane, and a circular profile with a circular center and a radius of curvature r numerically equal to the distance f from the conic vertex to the finite focal point of the conic, wherein the circular profile is determined in a second reference plane orthogonal to the first reference plane. Either a light source or a light receiver may be placed at either the first location or the second location. The optical apparatus preferably has exactly one nonplanar light-reflecting surface between the first location and the second location.

The present approach utilizes a compoundly curved reflecting surface (i.e., a mirror) to interconvert between the line of light and the point of light. Because the reflecting surface acts in a reciprocal manner on light traveling in opposite directions along the beam path, the interconversion may be between a light introduced as a line and output as a point, or light introduced at a point and output as a line. Thus, a point source may be used to produce a line output, or a line source may be used to produce a point output. "Point" and "line" are used herein to refer to features that are non-dimensional and one-dimensional, respectively, in their mathematical idealizations. In practice, however, there is always some diffraction into one or two dimensions for a point, or into two dimensions for a line. This spreading beyond the idealization results in some spreading of the interconverted form, but this effect does not negate the applicability of the present invention.

Desirably, the optical apparatus has no refractive optical element such as a lens therein. That is, it is preferred that the optical apparatus is reflective only, in accomplishing the interconversion between a point of light and a line of light. The optical apparatus may be used in applications with other optical components, which may include refractive optical components. But the refractive optical components are preferably not part of the point/line interconversion optical apparatus.

The use of reflective optics to accomplish the point/line light interconversion, preferably in the form of a single curved reflecting surface, has important advantages. The optical apparatus is light, compact, and inexpensive to manufacture, inasmuch as the single reflecting surface may be made of coated plastics or other materials that are light in weight, and only one optical element is used. The reflecting surface may be readily manufactured by injection molding of a plastic material, or diamond-point turning of aluminum or other material. Because only one optical element is used, the optical apparatus is more resistant than a refractive optical system to the introduction of internal misalignments in assembly and/or in service. There is no internal misalignment of the optical elements, because there is only the one reflecting surface in the preferred approach, although there may be misalignment of the light source and the reflecting surface. The reflecting surface used in the optical apparatus functions independently of the wavelength of the light beam being reflected, so that there is no polychromatic aberration introduced into the light beam, regardless of the single wavelength or multiple wavelengths of the light beam. Because the reflecting surface is a conic, there are no monochromatic aberration in the interconversion between the point of light and the line of light.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
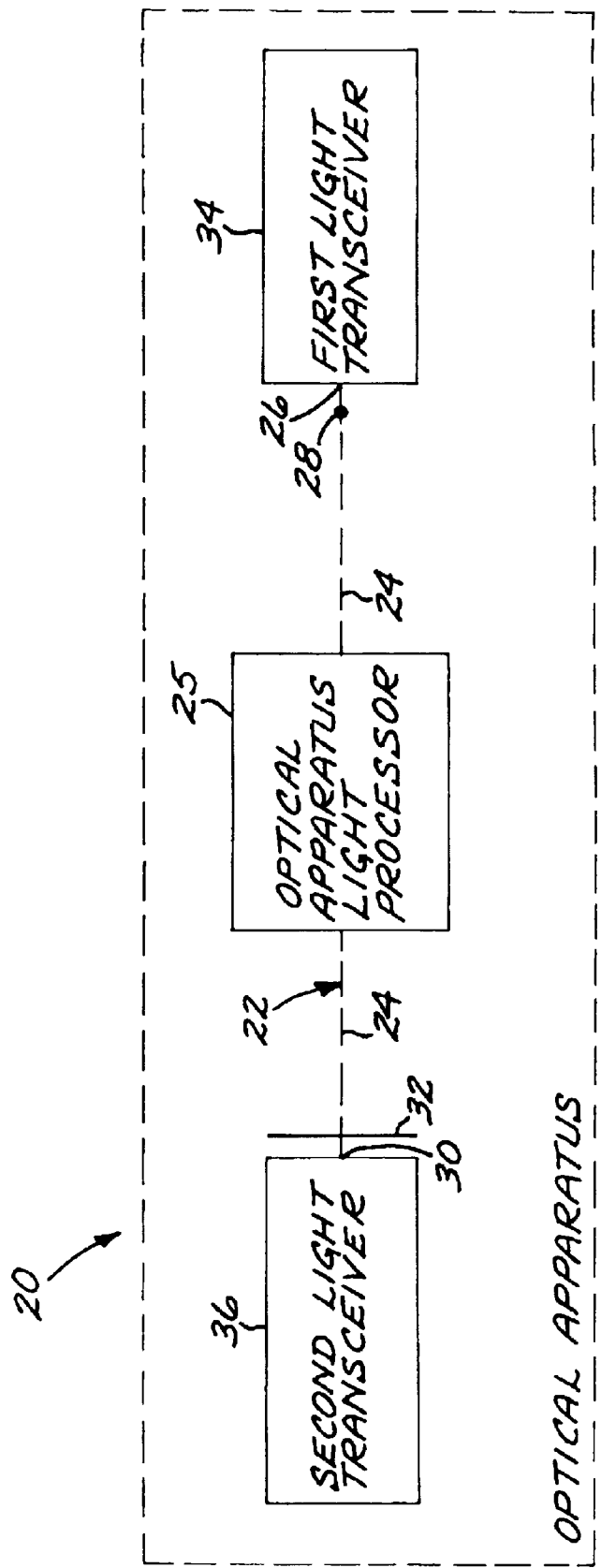
FIG. 1 is a schematic depiction of the optical apparatus.

FIG. 1 depicts in general form an optical apparatus 20. A light beam 22 travels through the optical apparatus 20 along a beam path 24 that passes through an optical apparatus reflective light processor 25. The optical apparatus reflective light processor 25 typically has no purely refractive optics elements (i.e., no pure lenses), and includes exactly one curved powered reflecting surface. A conventional mirror and a Mangin mirror (which places a reflective surface on one side of a refractive body) are both within the scope of the present approach. There may be additional beam-folding flat reflecting surfaces as needed according to the required geometry.

At a first end 26 of the beam path 24, the light beam 22 has a cross-sectional shape, viewed parallel to the beam path 24, of a conic finite focal point 28. (The "finite" focal point distinguishes a focal point located at infinity.) At a second end 30 of the beam path 24, the light beam 22 has a cross-sectional shape, viewed parallel to the beam path 24, of a line 32. "Point" and "line" are used in the sense of ideally being non-dimensional and one-dimensional features, respectively, but in reality having some breadth in other dimensions. The light beam 22 may be directed from the first end 26 toward the second end 30, or from the second end 30 toward the first end 26. Two light beams may pass bidirectionally and simultaneously between the ends 26 and 30.

Optionally, a first light transceiver 34 may be located at the first end 26 of the beam path 24, and/or a second light transceiver 36 may be located at the second end 30 of the beam path 24. Either of the light transceivers 34 and 36 may be a light transmitter or a light receiver, but usually one is a light transmitter and the other is a light receiver. If a light transmitter, the light transceiver transmits the light beam 22 toward the optical apparatus light processor 25. If a light receiver, the light transceiver receives the light beam 22 from the optical apparatus light processor. The light transmitter may be a single-wavelength light source or a multiple-wavelength light source. Examples of light transmitters are the ends of optical fibers, light emitting diodes, laser diodes, and bulbs. Examples of light receivers are light sensors, detectors, and scanners. Instead, at either the first end 26 or the second end 30 there may be no light transceiver.

Figure 2:
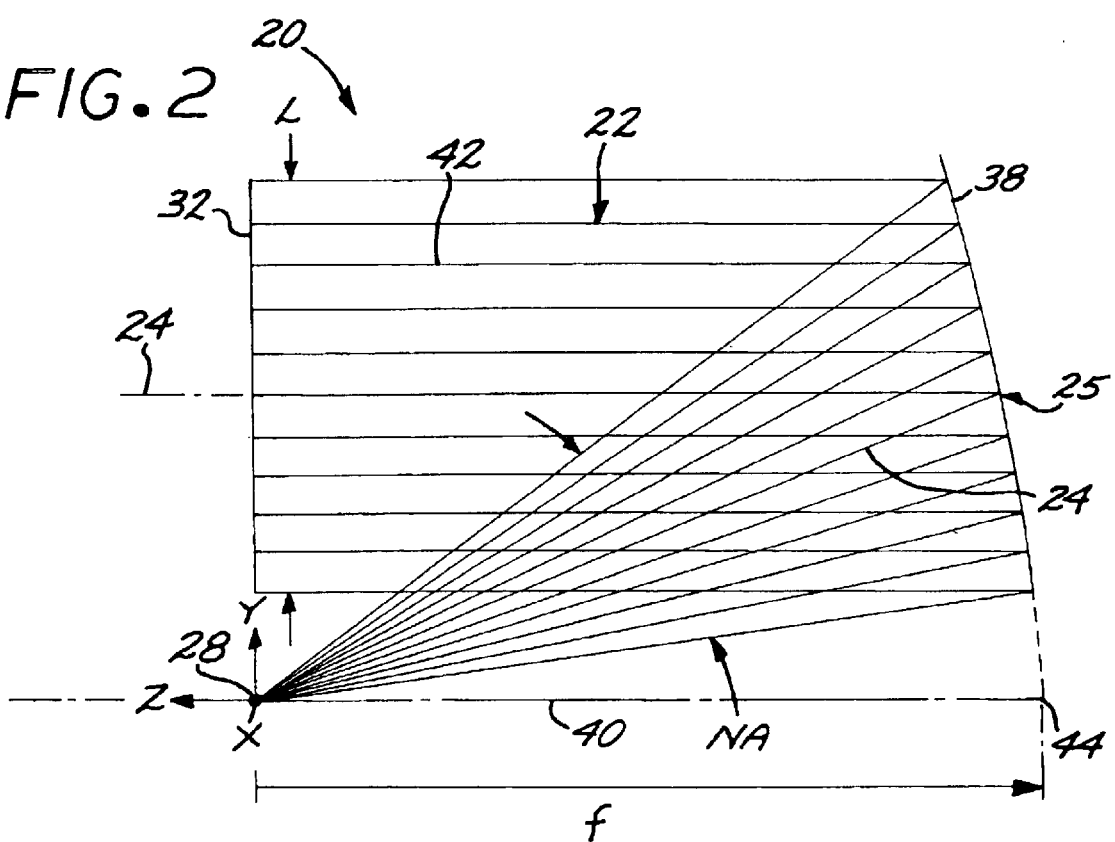
FIG. 2 is a sectional view of the optical apparatus in the yz plane.
Figure 3:
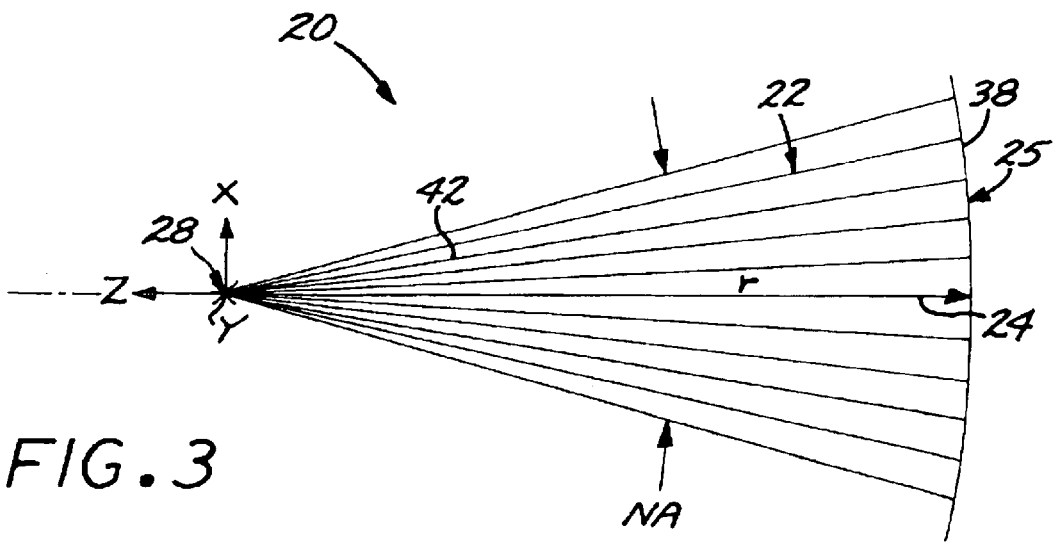
FIG. 3 is a sectional view of the optical apparatus in the xz plane.

The optical apparatus 20 includes, as part of its light processor 25, a light-reflecting surface 38, which has a shape referenced relative to an orthogonal axial system having an x-axis, a y-axis, and a z-axis, as illustrated in FIGS. 2–3. These axes also define a yz-plane, which is the plane of the illustration of FIG. 2, containing the y-axis and the z-axis; and an xz-plane, which is the plane of the illustration of FIG. 3, containing the x-axis and the z-axis.

The light-reflecting surface 38 is an off-axis segment and aperture of a non-circular conic profile with a conic axis 40 parallel to and co-incident with the z-axis and a distance f from a conic vertex 44 to the finite focal point 28 of the conic, when viewed in the yz-plane of FIG. 2. The conic vertex 44 is the location where the conic profile intersects the axis 40, although the physical light-reflecting surface 38 is off-axis and does not cross the axis 40. The non-circular conic profile of the light-reflecting surface 38 may be of any operable non-circular conic shape. An off-axis parabolic non-circular conic shape is preferred and is illustrated in FIG. 2, but other examples include elliptical and concave or convex hyperbolic non-circular conic shapes.

The conic axis 40 extends from the conic vertex 44 of the non-circular conic profile as seen in FIG. 2, but the reflecting surface 38 is itself off the conic axis 40. The light-reflecting surface 38 has a circular profile with a circular center that coincides with the conic finite focal point 28 and a radius of curvature r numerically equal to the distance f from the conic vertex 44 to the finite focal point 28 of the non-circular conic profile, when viewed in the xz-plane of FIG. 3. The conic finite focal point 28 lies on the conic axis 40 and serves as the origin of the (x, y, z) axial system at a distance −f from the conic vertex 44 of the non-circular conic profile. If present, the first light transceiver 34 is positioned to transmit or receive light at one of the finite foci of the conic, in this case the conic finite focal point 28. If present, the second light transceiver 36 transmits or receives light at the second end of the beam path 24 or at another location where the light beam 24 forms the conjugate line 32.

FIGS. 2 and 3 illustrate a set of ray paths 42 of the light beam 22, for the case of the preferred off-axis parabolic/circular conic profile. The light beam 22 in the form of a cone of light transmitted by the light transceiver 34 (which in this case is a light transmitter) from the conic finite focal point 28 and lying in the yz-plane is reflected from the reflecting surface 38 as the straight line 32 lying in the yz-plane, FIG. 2. The light beam 22 in the form of the cone of light emanating from the conic finite focal point 28 and not lying in the yz-plane is reflected back to the conic finite focal point 28 from the reflecting surface 38, FIG. 3. The width W of the line 32, measured perpendicular to the yz-plane, is approximately W=(width of light source)+ 2.44λF#, where λ is the wavelength of the light, F#=1/(2NA), and NA is the numerical aperture of the light transmitter 34. The length L of the line 32 measured parallel to the y-axis in the yz-plane is approximately L=f/(2NA), where f is the focal length (i.e., the conic finite focal distance) of the off-axis parabolic reflecting surface 38 in the yz-plane and also the radius of curvature r of the circular reflecting surface 38 in the xz-plane.

For an inverse-path light beam 22 propagating from the line 32, lying in the yz plane, toward the conic finite focal point 28, the light rays 42 reflect from the off-axis parabolic-profile light-reflecting surface 38 to the conic finite focal point 28.

Alternatively stated, the optical apparatus 20 effects an interconversion in shape of the light beam 22 between the non-dimensional conic finite focal point 28 at the first end 26, and the one-dimensional line 32 at the second end 30. The nonplanar light-reflecting surface 38, positioned on the beam path 24 between the first end 26 and the second end 30, has the required curvature in each of the yz and xz planes such that a point of light at the conic finite focal point 28 at the first end 26 is interconverted with the line 32 of light at the second end 30.

As discussed earlier, there is preferably no lens positioned in the beam path 24 within the optical apparatus 20, between the conic finite focal point 28 and the line 32. Any lens within the optical apparatus 20 would alter the character of the light beam 22, and would also adversely affect the aberration-free nature of the all-reflective optical apparatus 20. The presence of any lens would also add weight, size, complexity, and cost. If necessary, lenses may be used in either of the light transceivers 34 and 36, where present, but that is not preferred for the reasons stated. Lenses may also be used in other optical components to which the present optical apparatus 20 is functionally related.

Further, there is preferably exactly one nonplanar, powered, light-reflecting surface, the light-reflecting surface 38, within the optical apparatus 20. There may be planar fold mirrors to alter the direction but not the character of the light beam 22 within the optical apparatus 20, but any other nonplanar reflecting surfaces would alter the beam forming properties of the optical apparatus 20.

Figure 4:
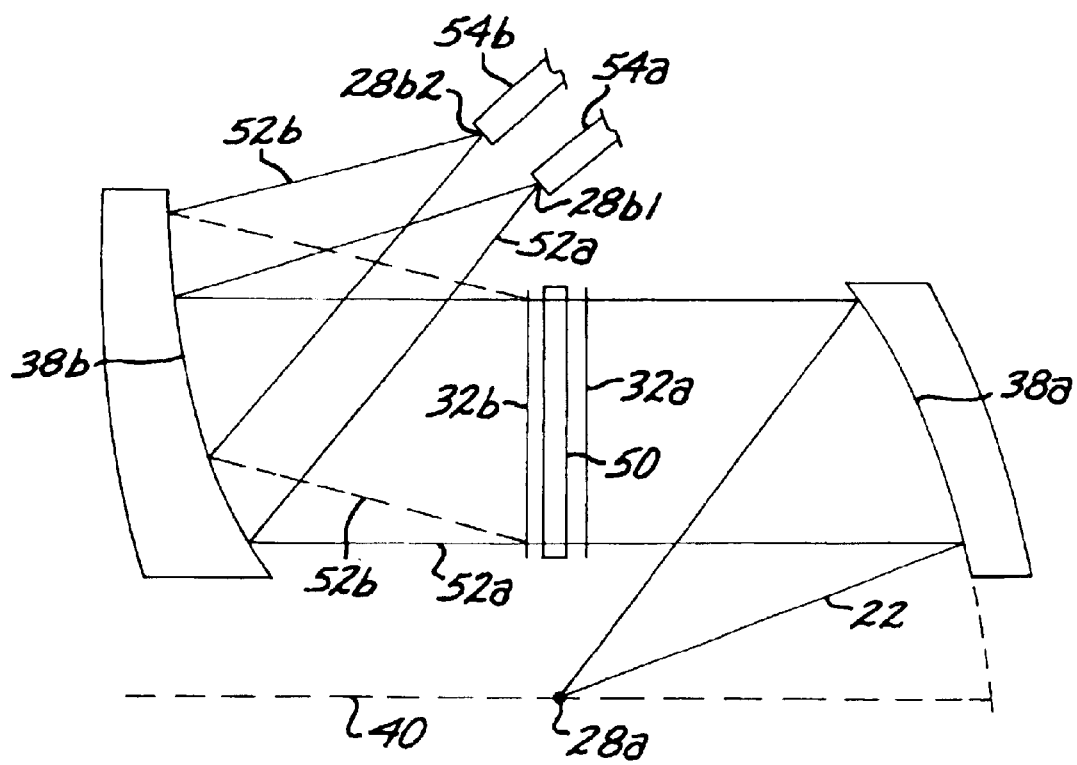
FIG. 4 is a schematic view of an optical system using a point-to-line interconversion and a subsequent line-to-point interconversion.

The present optical apparatus 20 for interconverting between a point of light and a line of light may be used in an optical system 48 in conjunction with other types of optical devices, an example of which is depicted in FIG. 4. In this example, a light beam provided as a point of light is converted to a line of light, processed in another optical device, and then converted back to a point of light for detection. More specifically in the example, a light source at the conic finite focal point 28a produces a light beam 22 that reflects from a parabolic/circular off-axis light-reflecting surface 38a of the type discussed in relation to FIGS. 2–3, to produce a line of light 32a. The line of light 32a passes through a controllable diffraction grating 50, producing an output line of light 32b, whose position varies according to whether the diffraction grating 50 is inactive or active. If the diffraction grating 50 is inactive, the line of light 32b is interconverted to a point of light at a conic finite focal point 28b1 by passing along a light path 52a and reflecting from the parabolic/circular off-axis light-reflecting surface 38b, of the type discussed in relation to FIGS. 2–3. The point of light at the conic finite focal point 28b1 is received by a collimator 54a of a first optical fiber for further processing. If the diffraction grating 50 is active, the output line of light 32b is interconverted to a point of light at conic finite focal point 28b2 by passing along a light path 52b and reflecting from the light-reflecting surface 38b. The point of light at conic finite focal point 28b2 is received by a collimator 54b of a second optical fiber for further processing. This example illustrates the use of the point-to-line and line-to-point optical interconversion apparatus in a more complex optical system that also employs other optical components such as the diffraction grating 50, but the present approach is also applicable in other optical systems as well, such as those using refractive components in the portion that does not accomplish the point-line interconversion.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical apparatus comprising:
   a nonplanar light-reflecting surface having a shape referenced relative to an orthogonal axial system having an x-axis, a y-axis, and a z-axis, wherein the light-reflecting surface has
   a non-circular conic profile with a conic axis and a distance f from a conic vertex to a finite focal point of the conic, wherein the non-circular conic profile is determined in a yz-plane containing the y-axis and the z-axis, and
   a circular profile with a circular center and a radius of curvature r numerically equal to the distance f from the conic vertex to the finite focal point of the conic, wherein the circular profile is determined in an xz-plane containing the x-axis and the z-axis; and
   a point light transceiver at a transceiver location, wherein the transceiver location lies on the conic axis in the yz plane, and also at the circular center in the xz plane.

2. The optical apparatus of claim 1, wherein the non-circular conic profile is a parabola.

3. The optical apparatus of claim 1, wherein the non-circular conic profile is an ellipse.

4. The optical apparatus of claim 1, wherein the non-circular conic profile is a hyperbola.

5. The optical apparatus of claim 1, wherein the point light transceiver comprises a point light source directing a light beam toward the reflecting surface.

6. The optical apparatus of claim 1, wherein the point light transceiver comprises a single-wavelength point light source.

7. The optical apparatus of claim 1, wherein the point light transceiver comprises a multiple-wavelength point light source.

8. The optical apparatus of claim 1, wherein the point light transceiver comprises a point light receiver receiving a light beam from the reflecting surface.

9. The optical apparatus of claim 1, wherein the optical apparatus has no lens therein.

10. The optical apparatus of claim 1, wherein the light-reflecting surface is concave relative to the point light transceiver.

11. An optical apparatus comprising:
    a nonplanar light-reflecting surface having a shape referenced relative to an orthogonal axial system having an x-axis, a y-axis, and a z-axis, wherein the light-reflecting surface has a parabolic profile with a parabolic axis and a distance f from a conic vertex to a finite focal point of the conic, the parabolic profile being determined in a yz-plane containing the y-axis and the z-axis, and a circular profile with a circular center and a radius of curvature r numerically equal to the distance f from the conic vertex to the finite focal point of the conic, the circular profile being determined in an xz-plane containing the x-axis and the z-axis; and a point light transceiver at a transceiver location, wherein the transceiver location lies on the parabolic axis in the yz plane, and also at the circular center in the xz plane, wherein the optical apparatus has no refractive lens therein.

12. The optical apparatus of claim 11, wherein the point light transceiver comprises a point light source directing a light beam toward the reflecting surface.

13. The optical apparatus of claim 11, wherein the point light transceiver comprises a point light receiver receiving a light beam from the reflecting surface.

14. An optical apparatus effecting an interconversion of a light beam between a non-dimensional point at a first location and a one-dimensional line at a second location, the optical apparatus comprising a nonplanar light-reflecting surface positioned on a beam path between the first location and the second location, wherein the light-reflecting surface has a compound curvature having a non-circular conic profile with a conic axis and a distance f from a conic vertex to a finite focal point of the conic, wherein the non-circular conic profile is determined in a first reference plane, and a circular profile with a circular center and a radius of curvature r numerically equal to the distance f from the conic vertex to the finite focal point of the conic, wherein the circular profile is determined in a second reference plane orthogonal to the first reference plane.

15. The optical apparatus of claim 14, wherein the optical apparatus has no lens positioned on the beam path between the first location and the second location.

16. The optical apparatus of claim 14, wherein the optical apparatus has exactly one nonplanar light-reflecting surface between the first location and the second location.

17. The optical apparatus of claim 14, further including a light source at the first location.

18. The optical apparatus of claim 14, further including a light receiver at the first location.

* * * * *